Feb. 9, 1954     H. A. WINTERMUTE     2,668,600
ELECTRODE STRUCTURE
Filed April 6, 1953     2 Sheets-Sheet 1
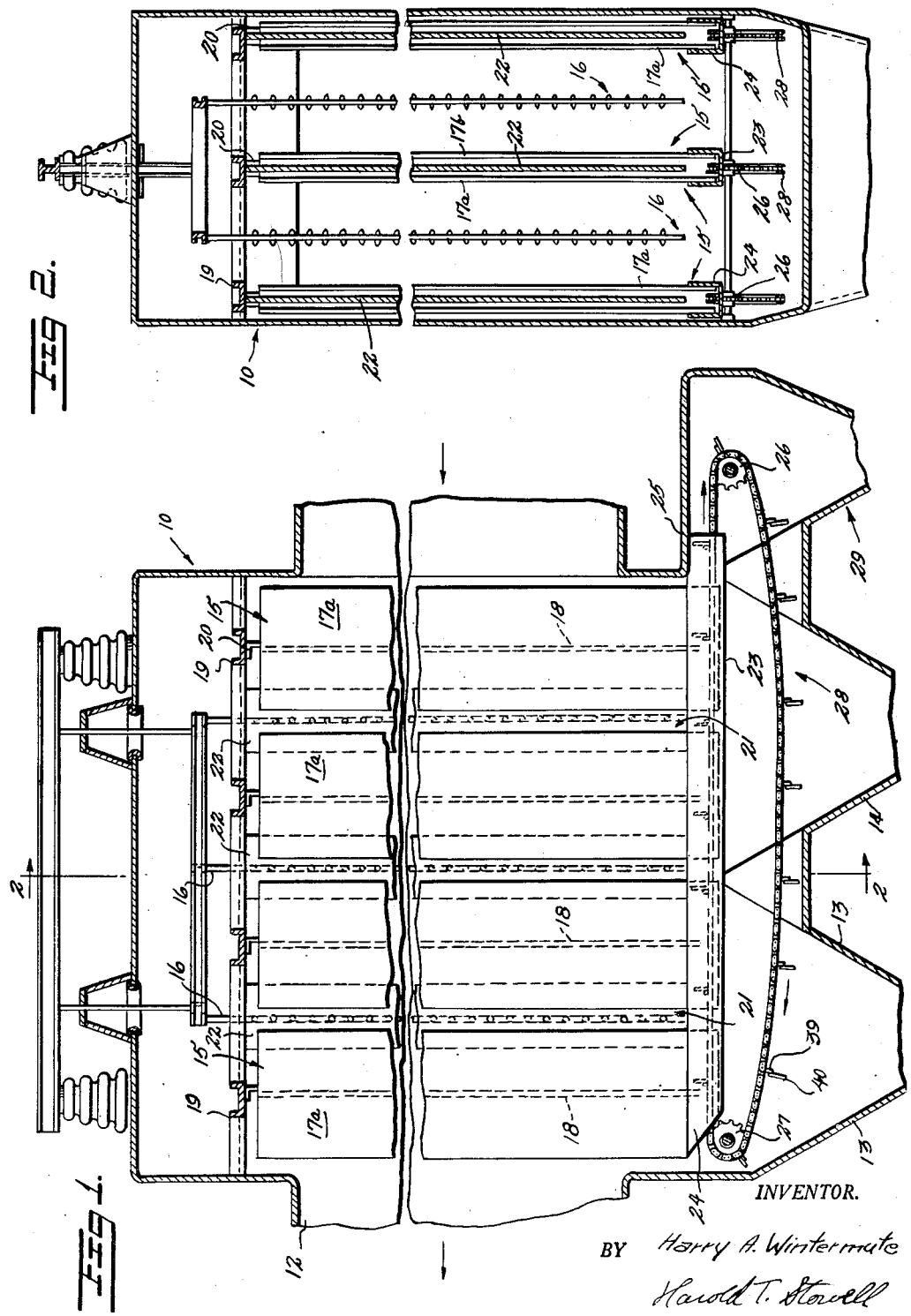
INVENTOR.
BY Harry A. Wintermute
Harold T. Stowell
ATTORNEY Feb. 9, 1954
H. A. WINTERMUTE
2,668,600
ELECTRODE STRUCTURE
Filed April 6, 1953
2 Sheets-Sheet 2
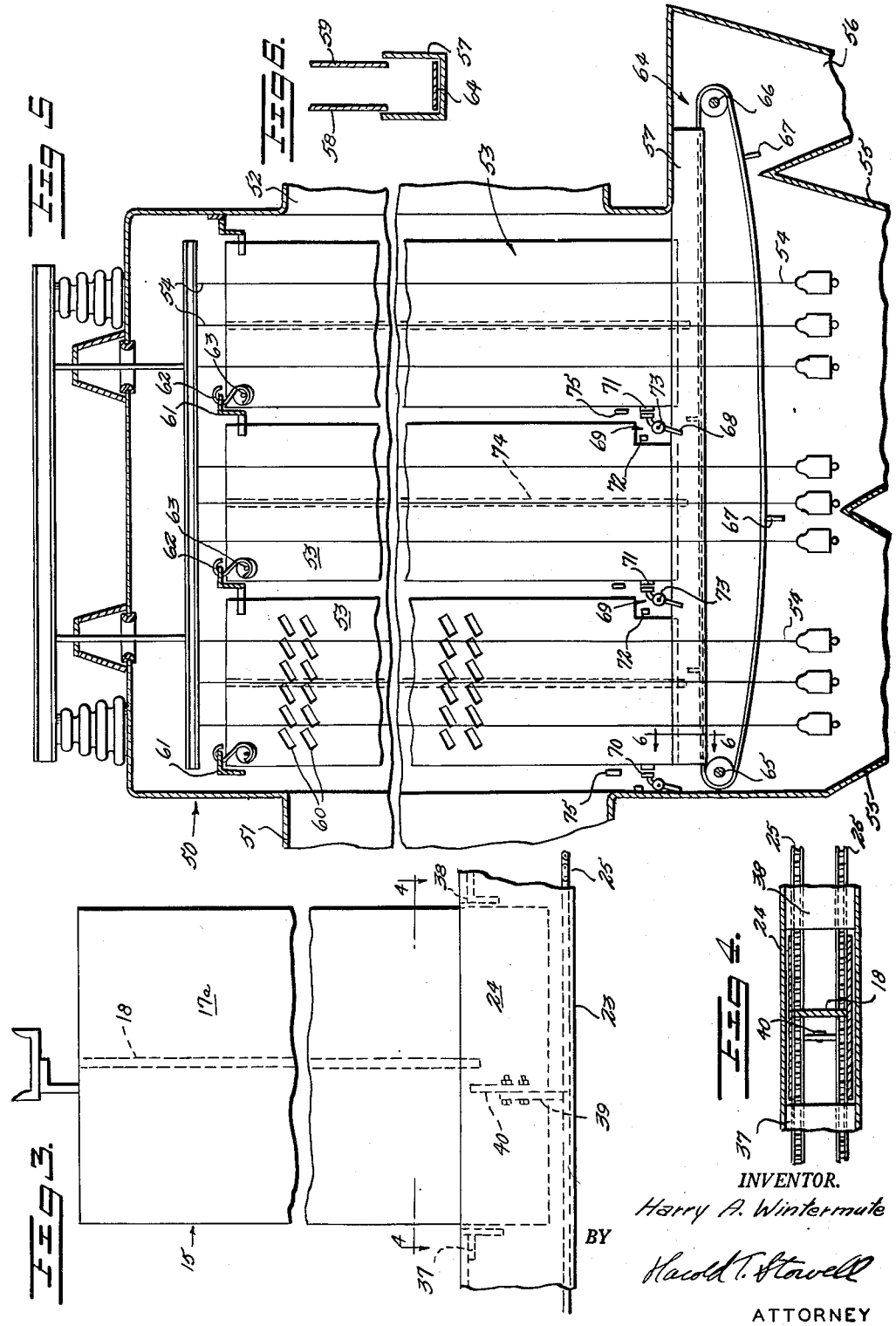
INVENTOR.
Harry A. Wintermute
BY
Harold T. Stowell
ATTORNEY Patented Feb. 9, 1954

2,668,600

UNITED STATES PATENT OFFICE 2,668,600

ELECTRODE STRUCTURE

Harry A. Wintermute, Plainfield, N. J., assignor to Research Corporation, New York, N. Y., a corporation of New York Application April 6, 1953, Serial No. 346,860

7 Claims. (Cl. 183—7)

This invention relates to an electrode cleaning device for electrical precipitators. More particularly, the invention relates to a novel rapper device for hollow or tulip type collecting electrodes.

In the collection of fine gas borne particles or particles of light material which have a tendency to be picked up again by the moving gas stream after having been precipitated on the collecting electrode, it has been found that collecting electrodes comprising a plurality of box-type hollow electrodes wherein the collected material is directed within the collecting electrode greatly minimize the resuspension of the precipitation material in the moving gas stream.

Hollow, specially constructed electrodes have also proven very satisfactory in fly ash collection.

Fly ash from boilers, particularly boilers burning powdered or finely pulverized coal, is suspended in the flue gases. This ash is chiefly composed of (1) fine ash particles that are low in carboniferous material and hence cannot be reburned advantageously and (2) particles of unburned coal and relatively large particles of coked coal that are high in carbon and low in ash content and that can be returned to the boiler together with the powdered coal feed. If the high carbon fraction of the fly ash can be separated from the fine ash particles, the former can be returned to the furnace and burned either alone or together with the powdered coal feed.

Such a structure is shown and claimed in my copending application Serial No. 250,965, filed October 12, 1951, of which this application is a continuation-in-part.

In these and other box-type collecting electrodes it is necessary to rap the structures to prevent the build-up of precipitated material from within the structure and to provide means for satisfactorily removing the collected material from the lower end of such structures.

In cases where differential collection is desired the removal of the collected material must be such that there is substantially no opportunity for intermixing of the internal and external collected material and in the case of the standard box-type collecting electrodes, it is desired to collect the precipitated material with as little resuspension as possible. It has been found that on box-type electrodes where their bottoms are open, there are often up-drafts of gas which prevent the dust from falling properly. It has also been found that when such electrodes are rapped the masses of dust dropping from the plates cause heavy rapper puffs which substantially lower the overall efficiency of the installation.

It is, therefore, a principal object of the invention to provide a novel dust rapper and conveyor system for hollow type collecting electrodes.

It is a further object to provide such a device that is simple in construction, efficient in operation and requires comparatively little maintenance down time and expense.

Another object of the invention is to provide a combination rapper and conveyor system that is readily adaptable for use in differential dust collecting systems employing hollow or box-type collecting electrodes.

These and other objects and advantages are provided by an electrical precipitator comprising a housing, gas inlet and gas outlet means providing for the passage of a stream of gas to be cleaned through said housing, a plurality of vertically extending collecting and discharge electrodes in said housing arranged in parallel rows, each of said collecting electrodes comprising an elongated box-like structure having a hollow interior, two of the opposed walls of the collecting electrodes having openings therethrough for the entry of collected particulate material, conduit means communicating with a plurality of said hollow collecting electrodes at their lower ends, conveyor means provided in said conduit means to move collected material therethrough, and rapper means for said collecting electrodes actuated by said conveyor means.

The invention will be more particularly described with reference to the illustrative embodiments of the invention in which:

Fig. 1 is a longitudinal, vertical, sectional view of one form of electrical precipitator embodying the invention;

Fig. 2 is a transverse sectional view thereof along the plane of the line 2—2 of Fig. 1;

Fig. 3 is an enlarged fragmentary view of one collector unit shown in Figs. 1 and 2;

Fig. 4 is a sectional view taken along the plane of the line 4—4 of Fig. 3;

Fig. 5 is a longitudinal, vertical, sectional view of another form of electrical precipitator embodying the invention; and Fig. 6 is a section on line 6—6 of Fig. 5.

Referring to the drawings, particularly to Figs. 1 and 2 thereof, the electrical precipitator shown has a housing 10 provided with a gas inlet duct 11 and a gas outlet duct 12. Gas to be cleaned flows through the housing in the direction of the arrows of Fig. 1. The usual dust-receiving hoppers 13 and 14 are located at the bottom of the housing. The hoppers communicate with the precipitation chamber and are provided with conventional outlets (not shown) at their bottoms for removal of dust.

Within the housing are disposed collecting electrodes 15 and complementary discharge electrodes 16. The collecting electrodes are generally vertically disposed and parallel to the flow of gas through the precipitator; they are spaced transversely of the precipitator. The discharge electrodes are disposed intermediate the collecting electrodes.

Collecting electrodes 15 are assembled from a plurality of identical elements that are H-shaped in horizontal cross-section. The panels 17a and 17b are preferably of transite or other similar construction material that is semi-conducting or has a high electrical resistance. These panels are secured to a spacer strip 18, preferably of conducting metal. The H-shaped elements are suspended from a frame 19 by flexible brackets 20 that are suitably attached to the frame and to the spacer strips 18 so that they are free to swing to a limited extent in troughs 24.

These H-shaped elements are spaced apart in the longitudinal direction to provide vertical slots 21 that extend vertically across the path of the gas stream and are relatively narrow in the direction of flow of the gas stream.

Suspended from the frame 19 are a plurality of conductive metallic plates 22. These plates depend into the hollow interior of the collecting electrode structure and one such plate is provided for each pair of oppositely disposed slots 21. The plates extend in the vertical direction for substantially the full length of the slots and they are somewhat wider than the slots. The plates are spaced midway between opposed slots and are centered with respect thereto.

The bottoms of the H-shaped members are closed by strips 23 and conduits 24 interconnect the bottoms of the members. An endless flight conveyor or drag chain has its upper run 25 extending through the bottoms of the H-shaped members and conduits 24. The conveyor chain is trained over a driven sprocket 26 and an idler sprocket 27 and the lower run 28 of the conveyor is returned through space provided in the hopper area below the precipitation chamber. Material that settles in the bottoms of the hollow collecting electrodes is moved by the flight conveyor to a hopper 29.

The function and operation of the aforementioned electrode for differential collection of suspended material is fully set forth in my copending application Serial No. 250,965, filed October 21, 1951, which function forms no part of the present invention.

With particular reference to Figs. 3 and 4, details of the novel rapping device are shown. The spacer strip 18 depends into the trough 24 in which is carried the upper run 25 of the flight conveyor. The chain conveyor has flights 39 spaced at intervals therealong for scraping the bottom of the trough. The flights are provided with upstanding, flexible fingers 40 that extend somewhat above the level of the lower edge of the spacer strips 18. As the conveyor moves through the trough, the fingers 40 engage spacer strips 18 and snap under the lower edges thereof to impart a rapping or vibratory movement to the H-shaped member. Stop members 37 and 38 carried by the trough limit the swinging movement of the electrodes.

This action dislodges precipitated material from the collecting electrodes and sufficient vibratory motion is transmitted through the frame 19 to the metallic plates 22 to insure that the latter are kept practically free from deposits.

The speed at which the conveyor is driven and the number of flexible fingers 40 determine the frequency of the impacts imparted to the collecting electrodes.

With reference to Figs. 5 and 6 of the drawings, there is shown a modified form of the present invention. In the drawings, 50 is the casing of an electrostatic precipitator having a gas inlet 51 and gas outlet 52. Within the casing are supported complementary collecting and discharge electrodes 53 and 54 which are supported over dust receiving hoppers 55 and 56. The collecting electrodes 53 comprise a plurality of parallel rows of box or tulip-type electrodes which depend at their lower ends into parallel troughs 57. Each electrode comprises spaced walls 58 and 59, provided with a plurality of openings 60 therethrough for the entry of collected material. Each of the collecting units is suspended for limited movement within the casing by guide members 61 which are carried by the casing 50 and engage one of the upper ends of the electrode. Guide members 61 are also provided with openings through which one end of an S-shaped link 62 is suspended. The other end of the S-shaped link engages rod 63 secured to the other end of the collecting electrode. Thus one end of the electrodes is free to pivot upwardly away from the guide members 61 while the other end swings or pivots about the S-shaped links 62.

In each of the parallel troughs 57 is an endless belt conveyor 64 supported at one end of the trough by idler pulley 65 and at the other end by driver pulley 66. Spaced at predetermined intervals across the belt of the conveyor are upstanding scrapers 67. As the upper flight of the belt moves through the trough the upstanding scrapers engage the lower ends 68 of electrode rappers 69. The upper end of the rapper is provided with a hammer head 70 adapted to engage an anvil plate 71 secured to the collecting electrodes. A stop member 72 is provided for each rapper to limit its rearward displacement and to prevent the rapper from turning too far about its pivotal mounting 73. In operation, as the upstanding members 67 engage the lower ends 68 of the rappers, hammer heads 70 pivot away from anvil plates 71 and then swing back against the anvil plates as the member 67 release the lower ends of the rappers. The striking of the hammers against the anvil plates raps or vibrates the electrodes.

It is apparent that the rapper members shown in Figs. 5 and 6 can be used on the electrode system shown and described with reference to Figs. 1 through 5, and that the system employed in Figs. 1 through 4 can be used on the box-type electrodes of Figs. 5 and 6. For example, instead of the hammer type rappers 69 or in combination therewith each electrode can be provided with an internal rib member 74 the lower end of which extends into the trough 57 and is contacted by the scraper members 67. As the scraper members and the conveyor belt move through the trough, the electrodes are pivoted upwardly and then swing back to engage stop members 75 secured to the side walls of the casing. The impact of the electrode with the stop member 75 vibrates the collected material from the inside and outside surface thereof.

From the foregoing description it will be seen that a novel rapper and conveyor device for hollow or tulip type collecting electrodes is provided whereby the aims, objects and advantages of the invention are fully accomplished.

I claim:

1. An electrical precipitator comprising a housing, gas inlet and gas outlet means providing for the passage of a stream of gas to be cleaned through said housing, a plurality of vertically extending collecting and discharge electrodes in said housing arranged in parallel rows, each of said collecting electrodes comprising an elongated box-like structure having a hollow interior, two of the opposed walls of the collecting electrodes having openings therethrough for the entry of collected particulate material, conduit means communicating with a plurality of said hollow collecting electrodes at their lower ends, conveyor means provided in said conduit means to move collected material therethrough and rapper means for said collecting electrodes actuated by said conveyor means.

2. An electrical precipitator comprising a housing, gas inlet and gas outlet means providing for the passage of a stream of gas to be cleaned through said housing, a plurality of vertically extending collecting and discharge electrodes in said housing arranged in parallel rows, each of said collecting electrodes comprising an elongated box-like structure having a hollow interior, two of the opposed walls of the collecting electrodes having openings therethrough for the entry of collected particulate material, conduit means communicating with a plurality of said hollow collecting electrodes at their lower ends, conveyor means provided in said conduit means to move collected material therethrough, vibrator means for said collecting electrodes extending into said conduit, upstanding members carried by said conveyor means adapted to actuate said vibrator means as the conveyor means moves through said conduit means.

3. An electrical precipitator comprising a housing, gas inlet and gas outlet means providing for the passage of a stream of gas to be cleaned through said housing, a plurality of vertically extending collecting and discharge electrodes in said housing arranged in parallel rows, each of said collecting electrodes comprising an elongated box-like structure having a hollow interior, openings in the opposed walls of said electrodes for the entry of collected particulate material, conduit means communicating with a plurality of said hollow collecting electrodes at their lower ends, conveyor means provided in said conduit means to move collected material therethrough, said conveyor means including an endless conveyor flight, rapper hammers pivotally mounted adjacent the lower ends of the collecting electrodes, the lower ends of said rapper hammers extending into the conduit means, and outwardly extending members carried by said endless conveyor flight adapted to engage the lower end of the rapper hammers as the conveyor flight moves through said conduit means.

4. An electrical precipitator as defined in claim 3 wherein stop members are provided to limit the swing of the rapper hammer.

5. An electrical precipitator comprising a housing, gas inlet and gas outlet means providing for the passage of a stream of gas to be cleaned through said housing, a plurality of vertically extending collecting and discharge electrodes in said housing arranged in parallel rows, each of said collecting electrodes comprising an elongated box-like structure having a hollow interior, means pivotally mounting the upper ends of said collecting electrodes to the precipitator housing, openings in the opposed walls of said electrodes for the entry of collected particulate material, conduit means communicating with a plurality of said hollow collecting electrodes at their lower ends, conveyor means provided in said conduit means to move collected material therethrough, said conveyor means including an endless conveyor flight, electrode pivoting members secured to said collecting electrodes extending into said conduit means, and outwardly extending members carried by said endless conveyor flight adapted to engage said electrode pivoting members as the conveyor flight moves through said conduit means.

6. An electrical precipitator as defined in claim 5 including stop means secured to the precipitator housing to limit the pivotal movement of the collecting electrodes.

7. An electrical precipitator comprising a housing, gas inlet and gas outlet means providing for the passage of a stream of gas to be cleaned through said housing, a plurality of vertically extending collecting and discharge electrodes in said housing arranged in parallel rows, each of said collecting electrodes comprising an elongated box-like structure having a hollow interior, means pivotally mounting the upper ends of said collecting electrodes to the precipitator housing, openings in the opposed walls of said electrodes for the entry of collected particulate material, conduit means communicating with a plurality of said hollow collecting electrodes at their lower ends, conveyor means provided in said conduit means to move collected material therethrough, said conveyor means including an endless conveyor flight, electrode pivoting members secured to said collecting electrodes and extending into said conduit means, rapper hammers pivotally mounted adjacent the lower ends of the collecting electrodes, the lower ends of said rapper hammers extending into the conduit means, and outwardly extending members carried by said endless conveyor flight adapted to engage the lower end of said rapper hammers and said electrode pivoting members as the conveyor flight moves through said conduit means.

HARRY A. WINTERMUTE.

References Cited in the file of this patent

UNITED STATES PATENTS

| Number | Name | Date |
|---|---|---|
| 1,481,970 | Welch | Jan. 29, 1924 |

FOREIGN PATENTS

| Number | Country | Date |
|---|---|---|
| 48 | Australia | July 22, 1931 |